United States Patent [19]

Knoll

[11] 4,188,660
[45] Feb. 12, 1980

[54] DIRECT DRIVE BALLAST CIRCUIT

[75] Inventor: William C. Knoll, Turbotville, Pa.

[73] Assignee: GTE Sylvania Incorporated, Stamford, Conn.

[21] Appl. No.: 908,044

[22] Filed: May 22, 1978

[51] Int. Cl.² .................................. H02M 5/293
[52] U.S. Cl. .................................. 363/49; 363/97; 363/37; 331/113 A; 315/205; 315/220; 315/224; 315/DIG. 5; 315/DIG. 7
[58] Field of Search ................... 363/49, 97, 37; 331/113 A; 315/205, 209 R, 220, 224, 255, DIG. 5, DIG. 7

[56] References Cited

U.S. PATENT DOCUMENTS

| | | | |
|---|---|---|---|
| 4,104,715 | 8/1978 | Lawson | 315/DIG. 5 |
| 4,109,307 | 8/1978 | Knoll | 315/205 X |
| 4,127,795 | 11/1978 | Knoll | 315/205 X |
| 4,127,893 | 11/1978 | Goepel | 331/113 A X |

Primary Examiner—Alfred E. Smith
Assistant Examiner—Charles F. Roberts
Attorney, Agent, or Firm—Thomas H. Buffton

[57] ABSTRACT

A direct drive electronic ballast circuit suitable for a fluorescent lamp load includes a high frequency oscillator inverter circuit having a tuned output circuit coupled to a load and to a drive circuit series connected to the load and dependent upon current flow therein. The high frequency oscillator inverter circuit is also coupled to a pulsed DC potential source which is shunted by a charge storage and isolating circuit energized by a feedback rectifier circuit which supplies energy whenever the potential from the pulsed DC potential source decreases below a given reference level. A relaxation type oscillator is coupled to the high frequency oscillator inverter circuit and provides a starting capability therefore.

19 Claims, 2 Drawing Figures

DIRECT DRIVE BALLAST CIRCUIT

CROSS REFERENCE TO OTHER APPLICATIONS

A pending application entitled "High Power Factor Conversion Circuitry" bearing U.S. Pat. No. 4,109,307 filed May 4, 1977 in the name of the present inventor and assigned to the assignee of the present application includes a feedback potential storage capability. Also, U.S. Pat. Nos. b 4,127,795 and 4,127,893 entitled "Lamp Ballast Circuit" and "Tuned Oscillator Ballast Circuit With Transient Compensating Means" and filed Aug. 19, 1977 and Aug. 17, 1977 respectively in the names of the present inventor and Charles A. Goepel respectively and assigned to the assignee of the present application relate to ballast circuitry wherein the load and oscillator drive circuitry are interdependent and a storage and isolating circuit provide for application of energy whenever a pulsed DC potential decreases below a given reference level.

BACKGROUND OF THE INVENTION

This invention relates to a direct drive electronic ballast circuit especially suitable for a fluorescent lamp load and more particularly to a direct drive ballast circuit having an oscillator inverter with a drive circuit dependent upon load current and initially responsive to energization from an oscillator starting circuit.

Presently, fluorescent lamp systems commonly employ ballast circuitry of the auto-transformer type. Such apparatus is obviously undesirably heavy, cumbersome and expensive as compared with ballast circuitry of the electronic type. Also, the auto-transformer type ballast is relatively inefficient, generates undesired heat, wastes energy and operates in the audible range.

Another popular form of ballast circuitry includes a flip-flop oscillator and saturable core transformer. The transformer core saturation characteristics are employed to limit current flow. Unfortunately, control and predictability of such current flow is difficult and unreliable in such apparatus as compared with electronic ballast circuitry.

A further form of ballast circuit, set forth in the previously mentioned copending application bearing U.S. Pat. No. 4,109,307, provides a storage capability whereby the pulsed DC potential applied to a tuned oscillator is altered to provide application of a substantially constant DC potential. However, it has been found that such circuitry leaves something to be desired with regard to unexpected changes in loading.

Still another form of electronic ballast circuitry provides a high frequency inverter coupled to a source of pulsed DC potential shunted by an energy storage and isolating circuit. Also, a feedback rectifier supplies energy to the storage and isolating circuit while the inverter is driven in accordance with current flow in a load circuit. Moreover, a relatively complex drive system is utilized to provide base drive for the high frequency inverter.

OBJECTS AND SUMMARY OF THE INVENTION

An object of the present invention is to provide ballast circuitry which eliminates or at least greatly reduces the above-mentioned problems associated with other known ballast circuitry. Another object of the invention is to provide enhanced direct drive electronic ballast circuitry. Still another object of the invention is to provide a direct drive electronic ballast circuit with an efficient switching capability. A further object of the invention is to provide a direct drive electronic ballast circuit having enhanced reliability and reduced drive circuit complexity and expense.

These and other objects, advantages and capabilities are achieved in one aspect of the invention by a direct drive electronic ballast circuit having a high frequency inverter coupled to a pulsating DC potential source shunted by a charge storage and isolating circuit with a feedback rectifier providing energy for the charge storage circuit. A load circuit is coupled to the output of the high frequency inverter and in series with the drive circuit for the high frequency inverter while a starting oscillator is coupled to the charge storage circuit and drive circuit to initiate oscillation of the high frequency inverter.

PREFERRED EMBODIMENT OF THE INVENTION

For a better understanding of the present invention, together with other and further objects, advantages and capabilities thereof, reference is made to the following disclosure and appended claims in conjunction with the accompanying drawings.

Figure 1:
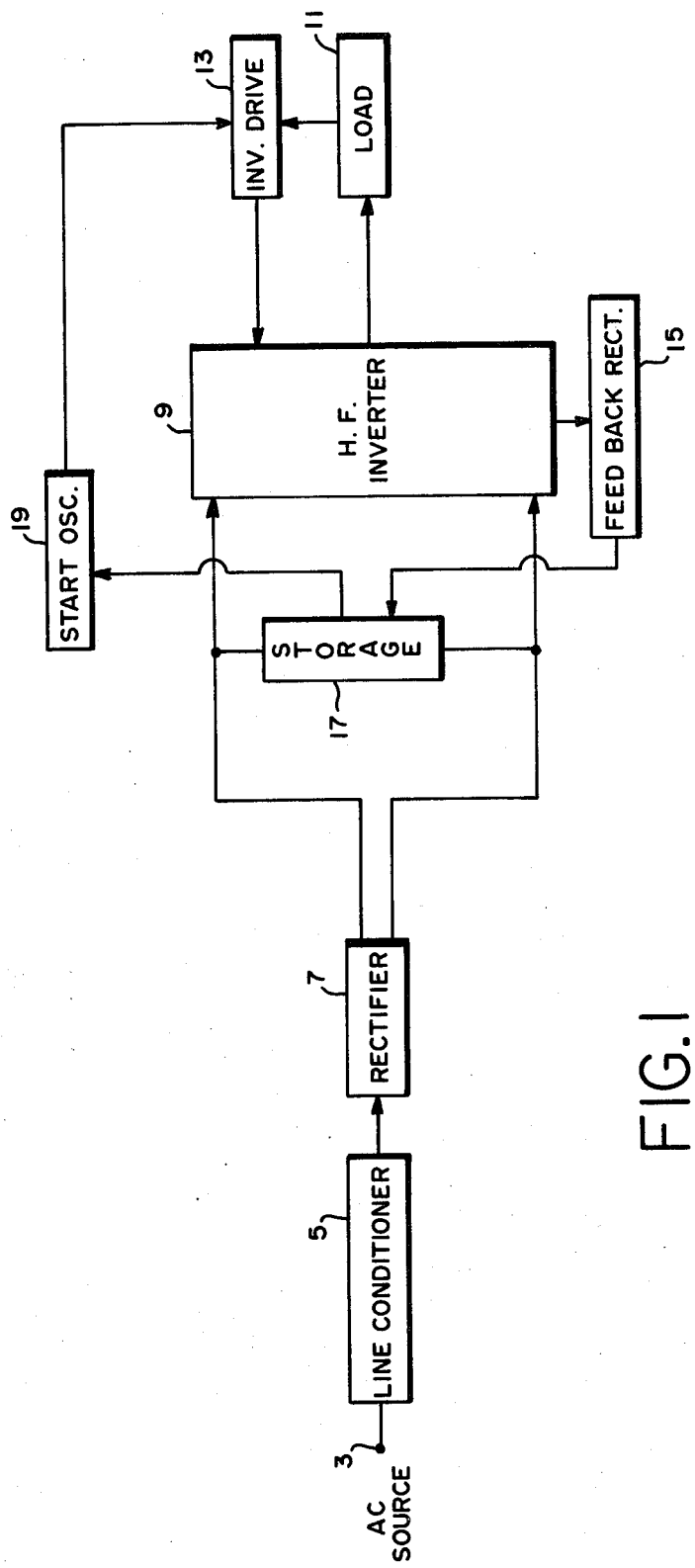
FIG. 1 is a block diagram of a preferred form of direct drive electronic ballast circuit.

Referring to the drawings, FIG. 1 illustrates, in block form, a preferred direct drive electronic ballast circuit. Herein, an AC source 3 is coupled by a line conditioner circuit 5 to a rectifier circuit 7 providing a pulsed DC potential. The rectifier circuit is coupled to a high frequency inverter 9 which has an output coupled to a load circuit 11. The load circuit 11 is series connected to an inverter drive circuit 13 which is, in turn, coupled to the high frequency inverter 9.

Also, a feedback rectifier circuit 15 provides energy to a charge storage and isolating circuit 17 shunting the rectifier circuit 7. Moreover, a starting oscillator circuit 19 is coupled to the charge storage and isolating circuit 17 and to the inverter drive circuit 13 coupled to the high frequency inverter 9.

As to general operation, the line conditioner circuit 5 filters out undesired transient and RF potentials and applies AC energy to the rectifier 7 to provide a pulsating DC potential for the high frequency inverter circuit 9. The high frequency inverter circuit 9 provides a high frequency signal to a load 11 such as a pair of fluorescent lamps for example. Moreover, the drive circuit 13 for the high frequency inverter 9 is series connected to the load 11 and dependent upon current flow therein to maintain operation of the high frequency inverter 9.

Also, a feedback rectifier circuit 15 provides energy to a charge storage and isolating circuit 17 which, in turn, supplies energy to the output of the rectifier 7 whenever the pulsating DC potential decreases below a given reference level. Thus, a relatively constant DC potential is supplied to the high frequency inverter 9. Moreover, the charge storage and isolating circuit 17 builds up sufficient energy, whenever the high frequency inverter 9 is not operating, to "fire" the starting oscillator 19. The starting oscillator 19 then provides a pulse output which activates the high frequency inverter drive circuit 13 and initiates operation of the high frequency inverter 9.

Figure 2:
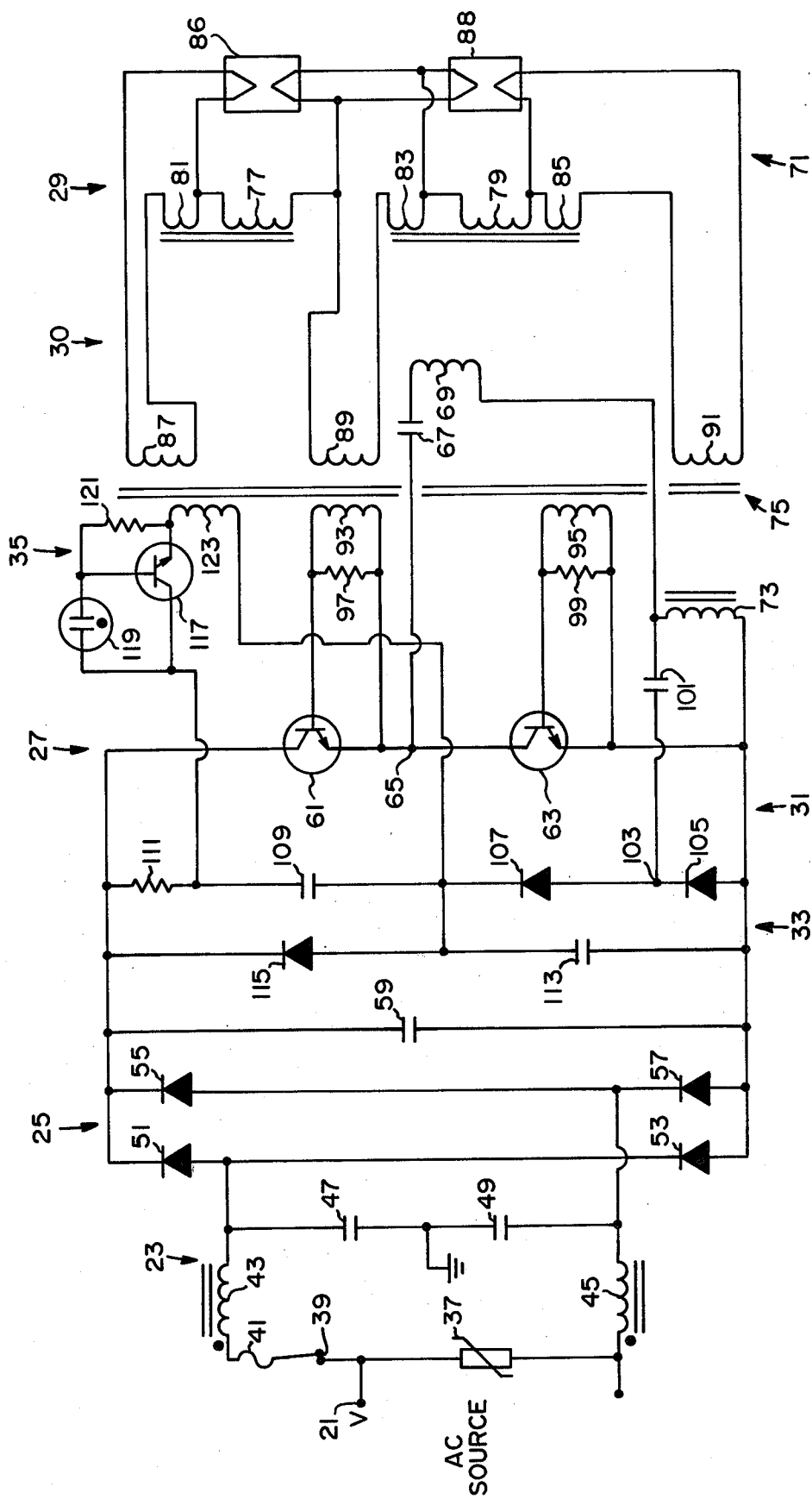
FIG. 2 is a schematic illustration of a direct drive electronic ballast circuit of the invention.

More specifically, FIG. 2 illustrates a preferred form of direct drive electronic ballast circuit. Herein, the AC potential source 21 is coupled to a line conditioner circuit 23 connected to a rectifier circuit 25. The rectifier circuit 25 is connected to a high frequency inverter circuit 27 coupled to a load circuit 29 in series connection with a drive circuit 30 for the high frequency inverter circuit 27.

A feedback rectifier circuit 31 couples energy back to a charge storage and isolating circuit 33 shunting the rectifier circuit 25. Moreover, the charge storage and isolating circuit 33 provides energy to a starting oscillator circuit 35 which activates the drive circuit 31 and the high frequency inverter circuit 27.

The line conditioner circuit 23 includes a transient suppressor 37 shunting the AC source 21. One side of the AC source 21 is coupled by a series connected overload switch 39 and fuse 41 to a first inductor 43 connected to the rectifier circuit 25. The other side of the AC source 21 is coupled by a second inductor 45 to the rectifier circuit 25. A first capacitor 47 couples the junction of the first inductor 43 and rectifier circuit 25 to circuit ground and a second capacitor 49 couples the junction of the second inductor 45 and rectifier circuit 25 to circuit ground.

The rectifier circuit 25 is in the form of a bridge-type full-wave rectifier having a first pair of series connected diodes 51 and 53 connected to the line conditioner circuit 23 and a second pair of series connected diodes 55 and 57 shunting the first pair of diodes 51 and 53 and connected to the line conditioner circuit 23. A filter capacitor 59 shunts the second pair of diodes 55 and 57.

The high frequency inverter circuit 27 includes first and second series connected transistors 61 and 63 shunted across the rectifier circuit 25. The junction 65 of the series connected transistors 61 and 63 is connected to a series connected capacitor 67, primary winding 69 of a second transformer 75, and inductive winding 73. The second transformer 75 has first and second secondary windings 77 and 79 series connected to first, second and third filament windings 81, 83 and 85 of the load 29 and coupled to a pair of fluorescent load lamps 86 and 88.

In series connection with the first and second secondary windings 77 and 79 of the second transformer 75 is the inverter drive circuit 30 including the first, second and third primary windings 87, 89 and 91 of the first transformer 71. In turn, secondary drive windings 93 and 95 are coupled to and provide drive currents for the first and second transistors 61 and 63 of the high frequency inverter circuit 27. Moreover, each of the secondary drive windings 93 and 95 is shunted by a damping resistor 97 and 99 respectively.

Also, coupled to the primary winding 69 of the second transformer 75 is a feedback rectifier circuit 31. This feedback rectifier circuit 31 is in the form of a voltage-doubler circuit having inductive winding 73 in series connection with the primary winding 69 and coupled by a capacitor 101 to the junction 103 of a pair of diodes 105 and 107. The diodes 105 and 107 are in series connection with a filter capacitor 109 and resistor 111 and the series circuit shunts the rectifier circuit 25.

Further, a charge storage and isolating circuit 33 includes a series connected charge storage capacitor 113 and an isolating diode 115 which also are shunted across the rectifier circuit 25. Moreover, the diode 107 of the feedback rectifier circuit 31 is connected and provides feedback energy to the junction of the charge storage capacitor 113 and the diode 115 of the charge storage and isolating circuit 33.

Additionally, a starting circuit 35, illustrated as a neon type relaxation oscillator, couples the charge storage and isolating circuit 33 to and initiates activation of the high frequency inverter circuit 27. The starting circuit 35 includes a transistor 117 having base and collector connected by a neon lamp 119 and base and emitter coupled by a resistor 121. The collector of the transistor 117 is connected to the junction of the capacitor 109 and resistor 111 while the emitter is coupled by way of a winding 123 to the junction of the charge capacitor 113 and isolating diode 115.

As to operation, the line conditioner circuit 23 serves as both a transient signal filter and a radio frequency interference (RFI) filter and has been set forth in detail in a previously mentioned U.S. Pat. No. 4,127,795. Essentially, the transient suppressor 37 serves to "clip" undesired transient spikes or signals appearing at the AC potential source 21. These "clipped" signals are further filtered by one of the series connected first and second inductors 43 and 45. These first and second inductors 43 and 45 acting in conjunction with the first and second capacitors 47 and 49 also serve as RFI filters inhibiting transfer of any such undesired signals which may appear at the AC potential source 21. Thus, the rectifier circuit 25 is energized by a source substantially devoid of undesired transient and RFI signals.

As to operation of the direct drive electronic ballast circuit, a potential available from the AC source 21 is applied to the line conditioner circuit 23 wherein undesired transient and RFI signals are removed or at least greatly reduced. Then the relatively "clear" AC signal is applied to the rectifier circuit 25 to provide a pulsating DC potential at a frequency of about 120 Hz.

This pulsating DC potential, as will be explained hereinafter is altered to provide a relatively steady-state DC potential which is applied to the high frequency inverter circuit 27. The high frequency inverter circuit 27 is in the form of a chopper or square wave oscillator with a pair of transistors 61 and 63 that switch in a push-pull mode. The oscillator or chopper incudes a series resonant output circuit having the capacitor 67 and primary winding 69 in series resonant connection. This series resonant circuit has a resonant frequency of about 20 KHz, which is well above the audio range, and provides a low impedance path for current flow therethrough. Thus, any increase in current flow through the primary winding 69 is accompanied by an increased current flow in the secondary windings 77 and 79.

Importantly, increased current flow in the secondary windings 77 and 79 and the load circuit 29 is accompanied by an increased current flow in the primary drive windings 87, 89 and 91. In turn, the secondary drive windings 93 and 95 provide increased base drive for the transistors 61 and 63 of the high frequency inverter circuit 27. Thus, the high frequency inverter circuit 27 not only derives drive potentials from the resonant loop of capacitor 67 and inductor 69 but also is dependent upon current flow in the load circuit 29.

Further, an increased current flow in the winding 69 is accompanied by increased current flow in the inductive winding 73. This increased current flow in the inductive winding 73 is rectified by the voltage doubler, including diodes 105 and 107, and applied to the charge capacitor 113 of the charge storage and isolating circuit 33. Therein, the capacitor 113 serves to store energy while the diode 115 serves to isolate the capacitor 113 from the pulsating DC potential so long as the pulsating DC potential does not decrease below a given reference level. However, when the pulsating DC potential does decrease below a given reference level, energy from the storage capacitor 113 is applied via the diode 115 to the rectifier circuit 25 to provide a relatively steady DC potential to the high frequency inverter circuit 27.

Additionally, it has been found that the most efficient transistor switching capability for the high frequency inverter circuit 27 was achievable by direct driving the transistors. However, it was also found that the high frequency inverter circuit 27 will not self-start when a transistor direct drive system is employed. Thus, a starting oscillator circuit 35 became necessary to initiate activity of the inverter circuit 27.

As to operation of the starting oscillator circuit 35, energy feedback to the storage capacitor 113 is not present when the inverter circuit 27 is not operational. As a result a relatively high voltage develops across the diode 115. When this voltage across the diode 115 reaches the firing voltage of the neon lamp 119, the neon lamp 119 will fire and provide a forward bias at the resistor 121. Thereupon, the transistor 117 provides a pulse at the winding 123 which "triggers" the inverter circuit 27 via the drive windings 93 and 95 and activates the oscillator.

Moreover, when the inverter circuit 27 is operational, a charge is being applied to the storage capacitor 113. Thus, the voltage developed across the diode 115 is insufficient to "fire" the neon lamp 119 and activate the starting circuit 35. As a result, the starting circuit 35 is, for all practical purposes, removed from the circuit during operation of the inverter circuit 27 and only active when the inverter circuit 27 is not operational.

Thus, there has been provided a direct drive electronic ballast circuit for fluorescent lamp loads. The circuit not only utilizes the load current as a driving current for rendering the inverter circuit 27 operational but also protects the inverter circuit from undesired high currents whenever the load is removed. Also, the direct drive capability has been found most efficient for transistor switching thereby eliminating a multitude of base drive components. Moreover, the starting circuit permits initiation of operation and thereafter is, in essence, totally removed from the operational circuitry.

While there has been shown and described what is at present considered the preferred embodiment of the invention, it will be obvious to those skilled in the art that various changes and modifications may be made therein without departing from the invention as defined by the appended claims.

What is claimed is:

1. A direct drive electronic ballast circuit comprising:
   an AC potential source;
   rectifier circuit means coupled to said AC potential source for providing a pulsating DC potential;
   high frequency inverter circuit means coupled to said rectifier circuit means;
   a load circuit coupled to said high frequency inverter circuit;
   high frequency inverter drive circuit means coupling said load circuit to said high frequency inverter circuit;
   charge storage and isolating circuit means shunting said rectifier circuit means;
   feedback rectifier means coupling said high frequency inverter circuit means to said charge storage and isolating circuit means; and
   oscillator starting circuit means coupled to said charge storage and isolating circuit means and to said high frequency inverter drive circuit means whereby a potential developed at said charge storage and isolating circuit means activates said oscillator starting circuit which energizes said high frequency inverter circuit means.

2. The direct electronic ballast circuit of claim 1 including a line conditioning circuit coupling said rectifier circuit means to said AC potential source.

3. The direct drive electronic ballast circuit of claim 1 wherein said high frequency inverter circuit means includes a pair of series connected transistors shunting said rectifier circuit means and a series connected capacitor and inductor coupling said high frequency inverter circuit means to said load circuit.

4. The direct drive electronic ballast circuit of claim 1 wherein said load circuit includes a transformer secondary winding coupled to a primary winding connected to said high frequency inverter circuit means and in series connection with said high frequency inverter drive circuit means.

5. The direct drive electronic ballast circuit of claim 1 wherein said charge storage and isolating means is in the form of a series connected diode and capacitor shunting said rectifier circuit means.

6. The direct drive electronic ballast circuit of claim 1 wherein said feedback rectifier means is in the form of a voltage doubler coupling said high frequency inverter circuit means to said charge storage and isolating circuit means.

7. The direct drive electronic ballast circuit of claim 1 wherein said oscillator starting circuit is in the form of a neon relaxation oscillator coupling said charge storage and isolating circuit means to said high frequency inverter drive circuit means.

8. The direct drive electronic ballast circuit of claim 1 wherein said oscillator starting circuit includes a series connected transistor and transformer winding coupled to said charge storage and isolating circuit means and to said high frequency inverter drive circuit means, said transistor having first, second and third electrodes with a neon lamp coupling said first and second electrodes and an impedance coupling said second and third electrodes.

9. The direct drive electronic ballast circuit of claim 2 wherein said line conditioning circuit includes first and second inductors each coupling said AC source to said rectifier circuit means, first and second capacitors coupling the junction of said first and second inductors and said rectifier circuit means to circuit ground and a transient suppressor shunting said AC source.

10. A direct drive electronic ballast circuit comprising:
   an AC potential source;
   means coupled to said AC potential source for providing a pulsating DC potential;
   high frequency inverter means coupled to said means for providing a pulsating DC potential for providing a high frequency output potential;
   load circuit means coupled to said means for providing a high frequency output potential for energizing a load;
   drive circuit means coupling said means for energizing a load to said means for providing a high frequency output potential, said means providing driving potentials for said means for providing a high frequency output potential;

means shunting said means for providing a pulsating DC potential for storing a charge and selectively isolating the stored charge from said means for providing a pulsating DC potential;

means coupling said means for providing a high frequency output potential to said means for storing a charge and selectively isolating the stored charge from said means for providing a pulsating DC potential; said means being in the form of a feedback rectifier circuit; and means coupling said means for storing a charge and selectively isolating the stored charge to said means for providing driving potentials to said means for providing a high frequency output potential, said means being in the form of an oscillator starter circuit.

11. The direct drive electronic ballast circuit of claim 10 including means coupling said AC potential source to said means for providing a pulsating DC potential, said means conditioning said AC potential applied to said means for providing a pulsating DC potential.

12. The direct drive electronic ballast circuit of claim 10 including line conditioning means coupling said AC potential source to said means for providing a pulsating DC potential, said line conditioning means including first and second inductors each coupling said AC potential source to said means for providing a pulsating DC potential, first and second capacitors coupling said first and second inductors respectively to circuit ground, and a transient suppressor shunting said AC potential source.

13. The direct drive electronic ballast circuit of claim 10 wherein said means for providing a pulsating DC potential is in the form of a full-wave bridge rectifier.

14. The direct drive electronic ballast circuit of claim 10 wherein said means for providing a high frequency output potential is in the form of an oscillator inverter having a pair of series connected transistors shunting said means for providing a pulsating DC potential.

15. The direct drive electronic ballast circuit of claim 10 wherein said means for energizing said load circuit includes a transformer having a primary winding in series with a capacitor coupled to said means for providing a high frequency output potential and a first secondary winding coupled to a load.

16. The direct drive electronic ballast circuit of claim 10 wherein said means for providing driving potentials for said means for providing a high frequency output potential includes a second secondary winding of a transformer series connected to a first secondary winding of said transformer shunted by a load and coupled to said means for providing a high frequency output potential.

17. The direct drive electronic ballast circuit of claim 10 wherein said means for storing a charge and selectively isolating the stored charge from said means for providing a pulsating DC potential includes a series connected capacitor and diode.

18. The direct drive electronic ballast circuit of claim 10 wherein said means coupling said means for providing a high frequency output potential to said means for storing a charge and selectively isolating the stored charge from said means for providing a pulsating DC potential is in the form of a feedback rectifier connected as a voltage doubler circuit.

19. The direct drive electronic ballast circuit of claim 10 wherein said oscillator starting circuit is in the form of a neon relaxation oscillator.

* * * * *